United States Patent [19]

Ochi et al.

[11] Patent Number: 5,079,199

[45] Date of Patent: Jan. 7, 1992

[54] METHOD OF MANUFACTURING DIELECTRIC CERAMIC COMPOSITIONS OF LEAD-BASED PEROVSKITE

[75] Inventors: Atsushi Ochi; Seiji Takahashi; Kazuaki Utsumi; Masato Shirakata, all of Tokyo, Japan

[73] Assignee: NEC Corporation, Japan

[21] Appl. No.: 509,227

[22] Filed: Apr. 16, 1990

[30] Foreign Application Priority Data

Apr. 14, 1989 [JP] Japan .................. 1-94649
Aug. 30, 1989 [JP] Japan .................. 1-226032

[51] Int. Cl.$^5$ .................. C04B 35/00; C04B 35/46
[52] U.S. Cl. ......................... 501/135; 501/134; 501/136; 423/606; 423/635
[58] Field of Search ............ 501/134, 135, 108, 136; 423/606, 635

[56] References Cited

U.S. PATENT DOCUMENTS 4,450,240  5/1984  Miyamoto et al. .................. 501/136

OTHER PUBLICATIONS

Yonezawa, New Low-Firing Materials for Multilayer Capacitors, Ferroelectrics, 1986, vol. 68, pp. 181-189.

*Primary Examiner*—William R. Dixon, Jr.
*Assistant Examiner*—Anthony J. Green
*Attorney, Agent, or Firm*—Leydig, Voit & Mayer

[57] ABSTRACT

A manufacturing method for dielectric ceramic compositions of lead-based perovskite containing lead magnesium tungstate [$Pb(Mg_{\frac{1}{2}}W_{\frac{1}{2}})O_3$] as a component which is characterized in that magnesium tungstate powder [$MgWO_4$] is used as a starting material instead of MgO and $WO_3$ powder.

7 Claims, No Drawings

METHOD OF MANUFACTURING DIELECTRIC CERAMIC COMPOSITIONS OF LEAD-BASED PEROVSKITE

BACKGROUND OF THE INVENTION

This invention relates to a method for manufacturing dielectric ceramic compositions of high dielectric constant, and more particularly to a manufacturing method of the material for capacitors especially suitable for multilayer ceramic capacitors.

Along with the trend of miniaturization, electronic components are being made in chip-type structure. Requirements for multilayer ceramic chip capacitors, in particular, have become more stringent in reliability, compactness, large capacity, low cost, and small temperature dependency of capacitance and high insulating resistance. In the prior art, such requirements were met by mainly using ceramics of barium titanate ($BaTiO_3$) group and shifting the Curie point by adding an additive or substituting the composition, in part, so as to lower the temperature dependency. Recently, attention has been focused on dielectrics having a composition of lead-based perovskite structure and par containing lead magnesium tungstate [$Pb(Mg_{\frac{1}{2}}W_{\frac{1}{2}})O_3$] as disclosed in U.S. Pat. No. 4,450,240 granted on May 22, 1984 for Haruhiko Miyamoto et. al.

Barium titanate ($BaTiO_3$) group is excellent in temperature characteristics, but its dielectric constant is approximately 3000 at maximum which cannot satisfy the stringent requirements for small multilayer ceramic chip capacitors. The perovskite structure compound mainly comprising lead magnesium tungstate [$Pb(Mg_{\frac{1}{2}}W_{\frac{1}{2}})O_3$] is antiferroelectric at a temperature below the phase transition temperature (Curie temperature), and as a solid solution, is high in dielectric constant and insulating resistance and small in temperature variation.

However, following problems arise if the conventional method of synthesizing lead magnesium tungstate [$Pb(Mg_{\frac{1}{2}}W_{\frac{1}{2}})O_3$] is attempted in which powders of lead oxide (PbO), magnesium oxide (MgO), and tungsten oxide are respectively mixed, calcined, pulverized and sintered. In this group, the reaction of lead oxide and tungsten oxide takes place preferentially at relatively low temperatures to produce $Pb_2WO_5$ and compounds of unfixed ratios. These compounds are in a liquid phase at temperatures of 750°~850° C. which is the conventional range of calcination, and tend to agglutinate at the time of calcination to prevent formation of a uniform composition. Magnesium oxide is relatively stable in this group, reacts weakly, and often remains in the sintered final product. As the liquid phase takes place, if calcination temperature is elevated to promote magnesium oxide reaction, powders become agglutinated and caked simultaneously. Similar problems are encountered in the case of perovskite solid solution containing as a component, lead magnesium tungstate. More specifically, when it is used in the manufacture of multilayer ceramic capacitors, the magnesium oxide reaction is not entirely complete, leaving unreacted residue within the sintered product after the sintering process. At the same time, excess lead oxide and tungsten oxide form a liquid phase an agglutinate at the grain boundary or at the triple point. Therefore, the dielectric constant of the sintered products becomes low, the temperature characteristics of the dielectric constant extremely unstable, and the resistivity and breakdown voltage reduced.

SUMMARY OF THE INVENTION

An object of this invention is to provide a method for stable manufacture of dielectric ceramic compositions having a high dielectric constant, a stable temperature variation ratio, a high insulating resistance, and a high breakdown voltage, when a perovskite solid solution containing lead magnesium tungstate [$Pb(Mg_{\frac{1}{2}}W_{\frac{1}{2}})O_3$] is used as a component.

According to this invention manufacturing method of dielectric ceramic compositions, the manufacturing method of a perovskite structure composition comprising as a component lead magnesium tungstate [$Pb(Mg_{\frac{1}{2}}W_{\frac{1}{2}})O_3$] is characterized by the use of magnesium tungstate compound ($MgWO_4$) powder instead of the powders of MgO and $WO_3$, conventional starting raw materials.

DESCRIPTION OF THE PREFERRED EMBODIMENTS

Preferred embodiments of this invention will now be explained more specifically by referring to Tables 1 through 3.

The magnesium tungstate ($MgWO_4$) powder is synthesized first according to a so-called mixed oxide method. Tungsten oxide and magnesium oxide powders were weighed to the mole ratio of 1:1, and wet mixed with a ball mill. Tungsten oxide ($WO_3$) and magnesium oxide (MgO) of more than 99.9% purity were used as the material. The mixture was filtrated, dried and reacted at 750~1000° C. to obtain magnesium tungstate ($MgWO_4$) powder.

Powders of lead oxide (PbO), nickel oxide (NiO), niobium oxide ($Nb_2O_5$), magnesium oxide (MgO), titanium oxide ($TiO_2$), and magnesium tungstate ($MgWO_4$) of more than 99% purity were used respectively as starting materials and weighed to the mix ratios shown in the tables. Weighed materials were wet mixed with a ball mill, filtrated, dried, and calcined at 750°~850° C. The powders were wet pulverized, filtrated, dried, mixed with 5% polyvinyl alcohol aqueous solution as a binder, granulated, and pressed to mold 16 discs of 16 mm diameter and 2 mm thickness for each of the mix ratios. These discs were sintered in the air at 925°~1050° C. for one hour. Silver electrodes were bonded by baking on both surfaces of the sintered disc samples at 600° C., and the capacity and dielectric loss were measured using a digital LCR meter at 1 kHz, 1 Vrms and −55°~125° C. Based on the above, dielectric constant and changes thereof at various temperatures were calculated. By applying 50 V for one second, insulation resistance at 20° C. was measured by means of a ultra high insulating meter, and specific resistivity was calculated. Characteristic values corresponding to each mix ratio (composition) were obtained from the means of characteristic values for each of the four samples.

Tables 1 through 3 show the relation of the mix ratios against the dielectric constant, dielectric loss and specific resistivity of thus obtained ceramic composition. For comparison, powders obtained by the prior art method wherein lead oxide (PbO), magnesium oxide (MgO), tungsten oxide ($WO_3$), nickel oxide (NiO), niobium oxide ($Nb_2O_5$), and titanium oxide ($TiO_2$) of more than 99% purity were weighed and mixed simultaneously to above, calcined at 750°~850° C., and wet pulverized with a ball mill. The resulting powders were molded, sintered and formed as sintered products in the form of disc. The conditions for calcination, wet-pulverization, press-molding, sintering, and processes therefor were similar to those used for at various temperature. Tables 1 through 3 show the relation of the dielectric constant, dielectric loss, and specific resistance of thus produced discs and mix ratios of the ceramic composition for the purpose of comparison. (The samples marked with * in Table 1).

The obtained powders were processed into multilayer ceramic capacitors by the following method and destroyed to measure the breakdown voltage.

Each of the ceramic composition powders was mixed with an organic binder and an organic solvent to produce a slurry mixture. The slurry was cast, dried on a polyester film of 30 μm thickness by the doctor blade method and cut into predetermined shapes to obtain green sheets. The green sheets were printed with the inner electrode patterns by the screen printing method and dried. A silver palladium paste was used as the paste for inner electrodes. As protecting layers, five unprinted green sheets were laminated on each side, and 10 printed sheets were laminated therebetween in the predetermined direction. Thus, the total of 20 sheets were thermally pressed for integration. The laminated sheets were cut into predetermined shapes and then sintered at the temperature of 900°~1050° C. after removing the organic binder by pyrolysis. Exterior electrodes were formed by applying a silver paste and firing to produce multilayer ceramic capacitors. Breakdown voltage was obtained by calculating mean values for each of 10 capacitors which were applied with D.C. voltages. The result is shown in Tables 1 through 3.

TABLE 1

| No. | Ratio of main components | | | materials used | sintering temperature (°C.) |
|---|---|---|---|---|---|
| | Pb(Mg 1/2 W 1/2)O$_3$ | Pb(Ni 1/3 Nb 2/3)O$_3$ | PbTiO$_3$ | | |
| 1* | 0.55 | 0 | 0.45 | PbO | 975 |
| 2* | 0.55 | 0 | 0.45 | MgO | 1000 |
| 3* | 0.55 | 0 | 0.45 | WO$_3$ | 1025 |
| 4* | 0.55 | 0 | 0.45 | TiO$_2$ | 1050 |
| 5 | 0.55 | 0 | 0.45 | PbO | 975 |
| 6 | 0.55 | 0 | 0.45 | MgWO$_4$ | 1000 |
| 7 | 0.55 | 0 | 0.45 | TiO$_2$ | 1025 |
| 8 | 0.55 | 0 | 0.45 | | 1050 |
| 9* | 0.98 | 0 | 0.02 | PbO | 925 |
| 10* | 0.98 | 0 | 0.02 | MgO | 950 |
| 11* | 0.98 | 0 | 0.02 | WO$_3$ | 975 |
| 12* | 0.98 | 0 | 0.02 | TiO$_2$ | 1000 |
| 13 | 0.98 | 0 | 0.02 | PbO | 925 |
| 14 | 0.98 | 0 | 0.02 | MgWO$_4$ | 950 |
| 15 | 0.98 | 0 | 0.02 | TiO$_2$ | 975 |
| 16 | 0.98 | 0 | 0.02 | | 1000 |

| No. | dielectric constant | | | temperature with the maximum dielectric constant (°C.) | maximum dielectric constant | resistivity (20° C. n·cm) | breakdown voltage of laminated ceramic capacitor (V) |
|---|---|---|---|---|---|---|---|
| | −55° C. | 20° C. | 125° C. | | | | |
| 1* | 1010 | 1480 | 1070 | 35 | 1560 | 9.6 × 10$^{12}$ | 100 |
| 2* | 1630 | 2330 | 1640 | 19 | 2340 | 1.0 × 10$^{13}$ | 130 |
| 3* | 2520 | 3190 | 2180 | 5 | 3360 | 1.2 × 10$^{13}$ | 150 |
| 4* | 3180 | 3580 | 2390 | −8 | 3980 | 1.3 × 10$^{13}$ | 180 |
| 5 | 2780 | 3390 | 2210 | −3 | 3690 | 1.2 × 10$^{13}$ | 350 |
| 6 | 3200 | 3610 | 2410 | −6 | 4010 | 1.3 × 10$^{13}$ | 510 |
| 7 | 3420 | 3850 | 2560 | −7 | 4280 | 1.3 × 10$^{13}$ | 490 |
| 8 | 3450 | 3890 | 2590 | −8 | 4320 | 1.4 × 10$^{13}$ | 550 |
| 9* | 170 | 350 | 390 | 26 | 530 | 1.2 × 10$^{13}$ | 80 |
| 10* | 190 | 540 | 420 | 23 | 560 | 1.4 × 10$^{13}$ | 70 |
| 11* | 200 | 600 | 440 | 20 | 600 | 1.7 × 10$^{13}$ | 110 |
| 12* | 220 | 640 | 460 | 17 | 650 | 2.1 × 10$^{13}$ | 90 |
| 13 | 260 | 780 | 600 | 21 | 800 | 2.2 × 10$^{13}$ | 380 |
| 14 | 270 | 810 | 620 | 19 | 820 | 2.3 × 10$^{13}$ | 430 |
| 15 | 280 | 830 | 630 | 18 | 840 | 2.3 × 10$^{13}$ | 410 |
| 16 | 280 | 830 | 630 | 17 | 850 | 2.4 × 10$^{13}$ | 420 |

Note
Those marked with * are not included in the scope of this invention.

TABLE 2

| No. | Ratio of main components | | | materials used | sintering temperature (°C.) |
|---|---|---|---|---|---|
| | Pb(Mg 1/2 W 1/2)O$_3$ | Pb(Ni 1/3 Nb 2/3)O$_3$ | PbTiO$_3$ | | |
| 17* | 0.30 | 0.30 | 0.40 | PbO | 975 |
| 18* | 0.30 | 0.30 | 0.40 | MgO | 1000 |
| 19* | 0.30 | 0.30 | 0.40 | WO$_3$ | 1025 |
| 20* | 0.30 | 0.30 | 0.40 | NiO Nb$_2$O$_5$ TiO$_2$ | 1050 |
| 21 | 0.30 | 0.30 | 0.40 | PbO | 975 |
| 22 | 0.30 | 0.30 | 0.40 | MgWO$_4$ | 1000 |
| 23 | 0.30 | 0.30 | 0.40 | NiO | 1025 |
| 24 | 0.30 | 0.30 | 0.40 | Nb$_2$O$_5$ | 1050 |

TABLE 2-continued

| No. | | | | | sintering temperature (°C.) |
|---|---|---|---|---|---|
| 25 | 0.30 | 0.30 | 0.40 | TiO₂ PbO | 975 |
| 26 | 0.30 | 0.30 | 0.40 | MgWO₄ | 1000 |
| 27 | 0.30 | 0.30 | 0.40 | NiNb₂O₆ | 1025 |
| 28 | 0.30 | 0.30 | 0.40 | TiO₂ | 1050 |
| 29* | 0.30 | 0.30 | 0.40 | PbO | 975 |
| 30* | 0.30 | 0.30 | 0.40 | MgO | 1000 |
| 31* | 0.30 | 0.30 | 0.40 | WO₃ | 1025 |
| 32* | 0.30 | 0.30 | 0.40 | NiNb₂O₆ TiO₂ | 1050 |

| No. | dielectric constant −55° C. | dielectric constant 20° C. | dielectric constant 125° C. | temperature with the maximum dielectric constant (°C.) | maximum dielectric constant | resistivity (20° C. n · cm) | breakdown voltage of laminated ceramic capacitor (V) |
|---|---|---|---|---|---|---|---|
| 17* | 4010 | 6830 | 5720 | 40 | 7780 | 2.5 × 10¹² | 180 |
| 18* | 4600 | 10190 | 4110 | 20 | 10210 | 2.9 × 10¹² | 280 |
| 19* | 4910 | 10380 | 4170 | 23 | 10460 | 3.8 × 10¹² | 250 |
| 20* | 5190 | 10960 | 4250 | 24 | 11070 | 4.5 × 10¹² | 270 |
| 21 | 5120 | 10180 | 4250 | 28 | 10680 | 5.8 × 10¹² | 640 |
| 22 | 5170 | 11410 | 4260 | 24 | 11430 | 6.4 × 10¹² | 830 |
| 23 | 5180 | 12300 | 4280 | 23 | 12310 | 7.2 × 10¹² | 890 |
| 24 | 5200 | 12310 | 4290 | 22 | 12320 | 7.5 × 10¹² | 950 |
| 25 | 5110 | 10190 | 4260 | 27 | 10250 | 4.7 × 10¹² | 740 |
| 26 | 5160 | 11430 | 4270 | 24 | 11450 | 6.1 × 10¹² | 820 |
| 27 | 5190 | 12290 | 4290 | 23 | 12310 | 7.3 × 10¹² | 1010 |
| 28 | 5210 | 12320 | 4300 | 22 | 12330 | 7.6 × 10¹² | 940 |
| 29* | 3580 | 7860 | 4230 | 34 | 8890 | 4.5 × 10¹² | 230 |
| 30* | 5130 | 10330 | 4140 | 28 | 10820 | 5.1 × 10¹² | 280 |
| 31* | 5170 | 11320 | 4290 | 24 | 11340 | 5.4 × 10¹² | 240 |
| 32* | 5180 | 11650 | 4320 | 22 | 11670 | 5.8 × 10¹² | 290 |

Note
Those marked with * are not included in the scope of this invention.

TABLE 3

| No. | Ratio of main components Pb(Mg 1/2 W 1/2)O₃ | Pb(Ni 1/3 Nb 2/3)O₃ | PbTiO₃ | materials used | sintering temperature (°C.) |
|---|---|---|---|---|---|
| 33* | 0.30 | 0.35 | 0.35 | PbO | 975 |
| 34* | 0.30 | 0.35 | 0.35 | MgO | 1000 |
| 35* | 0.30 | 0.35 | 0.35 | WO₃ | 1025 |
| 36* | 0.30 | 0.35 | 0.35 | NiO Nb₂O₅ TiO₂ | 1050 |
| 37 | 0.30 | 0.35 | 0.35 | PbO | 975 |
| 38 | 0.30 | 0.35 | 0.35 | TiO₂ | 1000 |
| 39 | 0.30 | 0.35 | 0.35 | MgWO₄ | 1025 |
| 40 | 0.30 | 0.35 | 0.35 | TiO₂ | 1050 |
| 41* | 0.30 | 0.35 | 0.35 | PbO | 975 |
| 42* | 0.30 | 0.35 | 0.35 | MgO | 1000 |
| 43* | 0.30 | 0.35 | 0.35 | MgNb₂O₆ | 1025 |
| 44* | 0.30 | 0.35 | 0.35 | TiO₂ | 1050 |
| 45 | 0.30 | 0.35 | 0.35 | PbO | 975 |
| 46 | 0.30 | 0.35 | 0.35 | MgWO₄ | 1000 |
| 47 | 0.30 | 0.35 | 0.35 | MgNb₂O₆ | 1025 |
| 48 | 0.30 | 0.35 | 0.35 | TiO₂ | 1050 |

| No. | dielectric constant −55° C. | dielectric constant 20° C. | dielectric constant 125° C. | temperature with the maximum dielectric constant (°C.) | maximum dielectric constant | resistivity (20° C. n · cm) | breakdown voltage of laminated ceramic capacitor (V) |
|---|---|---|---|---|---|---|---|
| 33* | 2550 | 6670 | 7080 | 60 | 8230 | 3.7 × 10¹² | 170 |
| 34* | 3730 | 9370 | 7350 | 52 | 11310 | 4.2 × 10¹² | 210 |
| 35* | 4370 | 10130 | 7130 | 46 | 11510 | 5.3 × 10¹² | 230 |
| 36* | 4850 | 10920 | 7280 | 42 | 12130 | 6.1 × 10¹² | 220 |
| 37 | 4510 | 10370 | 7210 | 45 | 11720 | 7.3 × 10¹² | 960 |
| 38 | 5070 | 11330 | 7450 | 43 | 12520 | 8.1 × 10¹² | 1080 |
| 39 | 5360 | 12070 | 7240 | 42 | 13410 | 8.3 × 10¹² | 990 |
| 40 | 5440 | 12150 | 7970 | 41 | 13430 | 9.1 × 10¹² | 1140 |
| 41* | 3620 | 8460 | 6040 | 57 | 9670 | 5.9 × 10¹² | 210 |
| 42* | 4240 | 10140 | 7550 | 50 | 11790 | 7.3 × 10¹² | 300 |
| 43* | 4730 | 10960 | 7720 | 46 | 12310 | 9.1 × 10¹² | 280 |
| 44* | 5090 | 11460 | 7630 | 42 | 12450 | 9.4 × 10¹² | 330 |
| 45 | 4360 | 9960 | 6820 | 44 | 11190 | 5.6 × 10¹² | 890 |
| 46 | 4940 | 11130 | 7420 | 42 | 12370 | 7.0 × 10¹² | 1090 |
| 47 | 5410 | 12090 | 7950 | 41 | 13360 | 7.1 × 10¹² | 1010 |

TABLE 3-continued

| 48 | 5420 | 13000 | 7960 | 41 | 13370 | $7.4 \times 10^{12}$ | 990 |
|----|------|-------|------|----|-------|---------------------|-----|

Note
Those marked with * are not included in the scope of this invention.

As is obvious from the results shown in Tables 1 through 3, the samples obtained by this invention method which is characterized in that magnesium tungstate powder (MgWO$_4$) is used as a starting material in the manufacture of the lead-based perovskite structure dielectric comprising lead magnesium tungstate [Pb(Mg$_{\frac{1}{2}}$W$_{\frac{1}{2}}$)O$_3$] showed superior characteristics. More specifically, compared to the samples obtained by the prior art method in which magnesium oxide (MgO) and tungsten oxide (WO$_3$) powders were mixed, calcined and wet pulverized with other metal oxides, the present invention samples have a higher dielectric constant, more stable temperature characteristic of the dielectric constant in respect of sintering temperatures, a higher resistivity, and multilayer, capacitors manufactured with this powder also have a higher breakdown voltage.

The method of this invention can obviate such problems as occurrence of a liquid phase between lead oxide and tungsten oxide as well as deterioration of characteristics caused by weak reaction of magnesium oxide. All the lead-based perovskite structure dielectrics containing lead magnesium tungstate as a main component can achieve the same effect. Similar effect can be attained by using compounds of which lead is partly substituted with barium, strontium or calcium. Similar effects are obtained in ceramic compositions containing as an additive a small amount of manganese oxide (MnO$_2$), lead manganese niobate [Pb(Mn$_{\frac{1}{2}}$Nb$_{\frac{2}{3}}$)O$_3$], lead manganese tungstate [Pb(Mn$_{\frac{1}{2}}$W$_{\frac{1}{2}}$)O$_3$], niobium oxide (Nb$_2$O$_5$), etc.

As shown in Table 2 under the numbers 25~28 and in Table 3 under the numbers 45~48, similar effects were obtained by the method using additionally the powder of nickel niobate (NiNb$_2$O$_6$) or magnesium niobate (MgNb$_2$O$_6$) which are synthesized in advance.

The effect similar to the above was obtained when a combination of powders of magnesium hydroxide Mg(OH)$_2$ and tungsten oxide (WO$_3$) was used by wet-mixing as the material for synthesizing magnesium tungstate (MgWO$_4$).

In addition to the composition groups mentioned above in the preferred embodiments, this invention achieved the same effect in the manufacture of ceramic compositions containing as main components one or more perovskite compounds such as lead magnesium niobate [Pb(Mg$_{\frac{1}{2}}$Nb$_{\frac{2}{3}}$)O$_3$], lead nickel niobate [Pb(Ni$_{\frac{1}{2}}$Nb$_{\frac{2}{3}}$)O$_3$], lead zinc niobate [Pb(Zn$_{\frac{1}{2}}$Nb$_{\frac{2}{3}}$)O$_3$], lead iron niobate [Pb(Fe$_{\frac{1}{2}}$Nb$_{\frac{1}{2}}$)O$_3$], lead manganese niobate [Pb(Mn$_{\frac{1}{2}}$Nb$_{\frac{2}{3}}$)O$_3$], lead titanate (PbTiO$_3$), lead zirconate (PbZrO$_3$) and lead magnesium tungstate [Pb(Mg$_{\frac{1}{2}}$W$_{\frac{1}{2}}$)O$_3$].

The ceramic composition obtained by this invention method is quite suitable as a dielectric ceramic composition to realize multilayer ceramic capacitors which have high dielectric constant, stable temperature-characteristics of dielectric constant, high resistivity, large capacity per unit volume, small temperature characteristics of capacity, and high in breakdown voltage.

What is claimed is:

1. A manufacturing method for dielectric ceramic compositions including steps of synthesizing, in advance, a powder of magnesium tungstate (MgWO$_4$) as raw material for magnesium (Mg) and tungsten(W) in a dielectric ceramic composition of lead-based perovskite materials composed of 30 to 98% lead magnesium tungstate (pb(Mg$_{\frac{1}{2}}$W$_{\frac{1}{2}}$)O3), mixing the powder of magnesium tungstate (MgWO$_4$) with powders of lead oxide (PbO) and at least one other metal oxide constituting component elements of the dielectric ceramic composition of lead-based perovskite material, and sintering the mixture of powders of the magnesium tungstate, the lead oxide, and the at least one other metal oxide at a temperature of 900° C. to 1050° C. to provide a dielectric ceramic composition possessing a high dielectric constant, a stable temperature variation ratio, a high insulating resistance, and a high breakdown voltage.

2. The manufacturing method for dielectric ceramic compositions as claimed in claim 1 wherein the powder of magnesium tungstate is obtained by the step of wet-mixing magnesium hydroxide (Mg(OH)$_2$) and tungsten oxide (WO$_3$).

3. The manufacturing method for dielectric ceramic compositions as claimed in claim 1 wherein the at least one other metal oxide contains titanium oxide (TiO$_2$).

4. The manufacturing method for dielectric ceramic compositions as claimed in claim 3 wherein the at least one other metal oxide further contains niobium oxide (Nb$_2$O$_5$).

5. A manufacturing method for dielectric ceramic compositions including steps of;
a) synthesizing a powder of magnesium tungstate from oxides or hydroxides of magnesium and tungsten,
b) mixing the magnesium tungstate powder with lead oxide powder to obtain a lead magnesium tungstate component,
c) combining with the lead magnesium tungstate component, an oxide component including a metal selected from the group consisting of lead, nickel, niobium, and titanium,
d) forming a lead-based perovskite containing 30 to 98% of the lead magnesium tungstate component and 2 to 45% of the oxide component, and
e) sintering mixture of powders of the lead magnesium tungstate component and the metal oxide component at a temperature of 900° C. to 1050° C. to obtain a dielectric ceramic composition exhibiting a high dielectric constant, stable temperature variation ratio, a high insulating resistivity, and high breakdown voltage.

6. A manufacturing method for dielectric ceramic compositions including steps of mixing powders of magnesium tungstate (MgWO$_4$), lead oxide (PbO), and titanium oxide (TiO$_2$), the amount of each of the powders being determined to compose 30 to 98 percent lead magnesium tungstate (Pb(Mg$_{\frac{1}{2}}$W$_{\frac{1}{2}}$)O$_3$) and 2 to 45 percent lead titanate (PbTiO$_3$), and of sintering mixture of all of the powders at a temperature of 900° C. to 1050° C.

7. A manufacturing method for dielectric ceramic compositions as claimed in claim 6 wherein the powders further include 30 to 35 percent niobium oxide (Nb$_2$O$_5$) to form lead nickel niobate (Pb(Ni$_{\frac{1}{2}}$Nb$_{\frac{2}{3}}$)O$_3$).

* * * * *